United States Patent [19]
Park et al.

[11] Patent Number: 5,922,104
[45] Date of Patent: Jul. 13, 1999

[54] SEPARATION MEMBRANES PREPARED FROM POLYAMIDE POLYMERS HAVING 2, 2'-BIS (TRIFLUOROMETHYL) BIPHENYL UNITS AND A PROCESS OF SEPARATING GASEOUS MIXTURES USING THEM

[75] Inventors: Hyun Chae Park; Jae Sik Na; Yong Soo Kang; Chul Joo Lee, all of Seoul, Rep. of Korea

[73] Assignee: Korea Institute of Science and Technology, Seoul, Rep. of Korea

[21] Appl. No.: 08/966,743

[22] Filed: Nov. 10, 1997

[30] Foreign Application Priority Data

Nov. 8, 1996 [KR] Rep. of Korea ............ 96-52937

[51] Int. Cl.⁶ .................................................. B01D 53/22
[52] U.S. Cl. ..................... 95/51; 95/53; 95/54; 95/55; 96/14; 210/500.38
[58] Field of Search .................... 95/45, 51, 53, 95/54, 47, 50, 52, 55; 96/4, 8, 10, 13, 14; 210/500.38

[56] References Cited

U.S. PATENT DOCUMENTS

| | | | |
|---|---|---|---|
| Re. 30,351 | 7/1980 | Hoehn et al. | 96/4 X |
| 3,822,202 | 7/1974 | Hoehn | 96/4 X |
| 3,899,309 | 8/1975 | Hoehn et al. | 55/158 |
| 4,474,858 | 10/1984 | Makino et al. | 96/13 X |
| 4,968,331 | 11/1990 | Sakashita et al. | 96/14 X |
| 4,981,497 | 1/1991 | Hayes | 96/14 X |
| 5,013,332 | 5/1991 | Surnamer et al. | 96/14 X |
| 5,034,027 | 7/1991 | Tien et al. | 96/14 X |
| 5,073,176 | 12/1991 | Arthur | 55/16 |
| 5,076,817 | 12/1991 | Hayes | 96/14 X |
| 5,102,600 | 4/1992 | Ekiner et al. | 264/177.15 |
| 5,178,940 | 1/1993 | Matsumoto et al. | 96/13 |
| 5,232,472 | 8/1993 | Simmons et al. | 96/14 |
| 5,248,319 | 9/1993 | Ekiner et al. | 96/14 X |
| 5,266,100 | 11/1993 | Simmons | 96/14 X |
| 5,286,539 | 2/1994 | Kusuki et al. | 96/13 X |
| 5,320,650 | 6/1994 | Simmons | 96/14 |
| 5,334,697 | 8/1994 | Simmons | 96/14 X |
| 5,647,894 | 7/1997 | Ohara et al. | 96/14 X |
| 5,716,430 | 2/1998 | Simmons | 96/14 X |
| 5,749,943 | 5/1998 | Shimazu et al. | 96/14 X |

OTHER PUBLICATIONS

A. Morisato, et al., Journal of Membrane Science, vol. 104, pp. 231–241, 1995, "Gas Separation Properties of Aromatic Polyamides Containing Hexafluoroisopropylidene Groups".

Detlev Fritsch, et al., Macromol. Chem. Phys., vol. 197, pp. 701–714, 1996, "Synthesis and Properties of Highly Gas Permeable Poly (Amide–Imide)s".

Chin–Ping Yang, et al., Journal of Polymer Science. vol. 34, pp. 341–348, 1996, "Synthesis and Properties of Aromatic Polyamides Derived from 1,7–Bis(4–Aminophenoxy)naphthalene and Various Aromatic Dicarboxylic Acids".

*Primary Examiner*—Robert Spitzer
*Attorney, Agent, or Firm*—Oblon, Spivak, McClelland, Maier & Neustadt, P.C.

[57] ABSTRACT

This invention provides a polyamide separation membrane, prepared from high molecular weight polyamide having a repeating unit represented by the formula (I) and a process for separating gaseous mixtures using them.

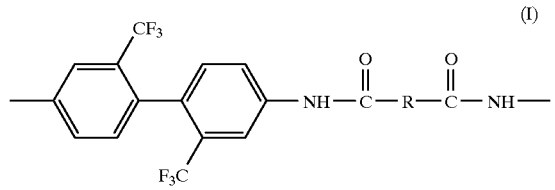

wherein, R is an aliphatic or aromatic organic group derived from dicarboxylic acid or halide. The polyamide separation membrane according to the present invention has a large free volume and good permeation properties such as permeability and permeation selectivity.

13 Claims, No Drawings

SEPARATION MEMBRANES PREPARED FROM POLYAMIDE POLYMERS HAVING 2, 2'-BIS (TRIFLUOROMETHYL) BIPHENYL UNITS AND A PROCESS OF SEPARATING GASEOUS MIXTURES USING THEM

BACKGROUND OF THE INVENTION

1. Field of the Invention

The present invention relates to a separation membrane having a good mass permeation property and a permeation selectivity, prepared from polyamide polymers containing 2,2'-bis(trifluoromethyl)biphenyl units and a process for separating gaseous mixtures using them. Technology which employs separation membranes for gaseous or liquid mixtures has been utilized in the various field. Such separation membranes have been used in a homogenous thin membrane or an asymmetric membrane type processed from polymeric or inorganic materials.

2. Description of the Prior Art

The polymeric separation membranes for separating fluids developed hitherto has been based on polymeric materials such as polyamides, polyimides, polysulphones, and the like. Polyamides are generally prepared by reacting diamines with dicarboxylic acids or dicarboxylic halides. While polyamides have superior mechanical and thermal properties, they also have low fluid permeability. In addition, the solvents in which polyamides can be dissolved are limited, and thus it is difficult to prepare the solutions for use in preparing the separation membranes. Improved gas separation polyamide membranes are reported in U.S. Pat. Nos. 3,899,309 and 5,073,176 incorporated herein with references, but there is still a need to improve a fluid permeability so as to enhance the efficiency of separation membranes.

SUMMARY OF THE INVENTION

Therefore, it is an object of the present invention to provide polyamide separation membranes having a superior fluid permeability.

It is another object of the present invention to provide a process of separating gaseous mixtures using the above polyamide separation membranes.

Further objects and advantages of the invention will become apparent through reading the remainder of the specification.

DETAILED DESCRIPTION OF THE INVENTION

Polyamide synthesized using 2,2'-bis(trifluoromethyl) benzidine as aromatic diamine monomer has two trifluoromethyl groups which are substituted on each of the two phenyl rings at the ortho position to the biphenyl linkage of benzidine. The free rotation of the biphenyl linkage is inhibited due to steric hindrance caused by the two trifluoromethyl groups thereby increasing the rigidity of polymer chains. Further, the bulky structure of the trfluoromethyl group inhibits the polymer chain packing, which results in the increase of the fractional free volume of the polymer. The increased polymer chain rigidity resulting from the interference of the free rotation of the biphenyl linkage enhances the permeation selectivity of the membranes made of the polymer, whereas the increase of the fractional free volume of the polymer due to the restricted polymer chain packing enhances the permeability of the polymer membranes. The present invention is based on such findings.

According to one aspect of the present invention, there is provided fluid separation membranes prepared from polyamides having the repeating unit represented by the formula:

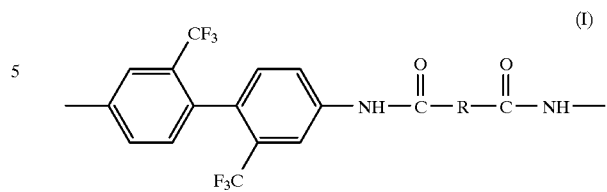

where R is an aliphatic or aromatic organic group derived from dicarboxylic acid or dicarboxylic halide.

Examples of suitable R substituents in the above formula (I) may include aliphatics containing more than 2 carbon atoms, such as adipic acid, cycloaliphatics containing more than 4 carbon atoms, such as 1,4-cyclohexane dicarboxylic acid, monocyclic aromatics, such as isophthalic acid, polycyclic aromatics, such as 1,5-naphthalene dicarboxylic acid, alkyl-substituted aromatics, such as 4-methylisophthalic acid, halo-substituted aromatics, such as 4-bromoisophthalic acid, and the like. As mentioned above, 2,2'-bis (trifluoromethyl) benzidine (TFMB) is employed as an aromatic diamine for preparing polyamides. 2,2'-Bis (trifluromethyl) benzidine generally is prepared by coupling 2-bromo-5-nitrobenzotrifluoride obtained from the nitration of2-bromobenzotrifuoride to synthesize 2,2'-bis (trifluoromethyl)-4,4'-dinitro-1,1'-biphenyl, which is then reduced to prepare 2,2'-bis(trifluromethyl) benzidine.

Examples of the dicarboxylic acid employed in the present invention include, but are not limited to, specifically isophthalic acid, terephthalic acid, 4-methyl isophthalic acid, 4-bromoisophthalic acid, 4,4'-bis(benzoic acid), 4,4'-methylene bis(benzoic acid), 4,4'-propylidene bis(benzoic acid), 4,4'-(2-isopropylidene) bis(benzoic acid), 4,4'-(hexafluoroisopropylidene) bis(benzoic acid), diphenyl ether 4,4'-dicarboxylic acid, diphenyl sulfone 4,4'-dicarboxylic acid, 2,6-pyridine dicarboxylic acid, diphenyl suiphide 4,4'-dicarboxylic acid, 1,5-naphthalene dicarboxylic acid,, 1,4-cyclohexane dicarboxylic acid, 4,4'-bis(anisic acid), 4,4'-bis(o-toluic acid), succinic acid, glutaric acid, adipic acid, pymellic acid, suberic acid, sebacic acid and the like. The dicarboxylic acid monomers are employed alone or as a mixtures of two or more in either dicarboxylic acid type or dicarboxylic halide type of which the carboxylic radical is halogenated, wherein such monomers are employed alone or in mixtures of two or more.

The polyamide separation membrane of the present invention is generally prepared by polymerizing 2,2'-bis (trifluoromethyl) benzidine with various type of dicarboxylic acid or dicarboxylic halide. The synthesized polyamide is dissolved in a suitable solvent to prepare a polymer solution, which is then cast into a proper shape such as a film or tubular shape.

A homogenous thin film of polyamide according to the present invention is prepared by casting the solution of polyamide dissolved in a solvent such as N-methyl-2-pyrollidone (NMP), N,N-dimethylformamide (DMF), N,N-dimethylacetamide (DMAC), tetrahydrofuran (THF), 1,4-dioxane, methylene chloride, chloroform, and the like. Any known techniques may be employed to cast the solution. Preferably, the film is cast by means of a doctor knife. The thin film itself can be used as a separation membrane, as well as in form of a composite membrane layed on a support. When a thin film itself is used as a separation membrane, the polymer solution is cast onto a support, such as a glass plate, a metal plate, etc. to form a flat film, and then dried by evaporating the solvent under an atmosphere in the absence of dust, and finally the produced film is stripped from the casting support. Alternatively, the polymer solution is spun in the form of a hollow fiber and the solvent is evaporated and dried under the same condition for the above flat film to obtain a separation membrane which is used as it is. Furthermore, the flat film produced by the above method may be used as a composite membrane laminated onto non-woven fabric, woven fabric, inorganic film or other polymer film. The composite membrane may be prepared by applying the polymer solution which is prepared by the same method for the preparation of the homogeneous thin film, on non-woven or woven fabrics and inorganic film in form of a flat sheet, a hollow fiber or tube and then drying under the same condition as for the homogeneous thin film, wherein the application of the polymer solution may be carried out by any known method in this art.

The advantageous selective fluid, especially gas, permeation property of the polyamide membrane according to the invention results from the structural configuration of the polyamide at the molecular level, rather than the macroscopic shape of the membrane.

According to the invention, a polymer solution of polyamide dissolved in a solvent, such as N-methyl-2-pyrrolidone at 5 to 30% by weight is cast on a glass plate with a thickness of 50 to 500 microns using a doctor knife, and dried in a drier maintained at 50° to 200° C., particularly 80° to 120° C. for 5 to 24 hours in the absence of dust. The dried thin film is then stripped from the support, treated in a vacuum oven maintained at 20° to 250° C., preferably 100° to 200° C., for 4 to 96 hours to remove the residual solvent completely out of the film. The resulting separation membrane is measured for its permeation property to gas.

The permeation property of a separation membrane is determined by permeability and permeation selectivity. Permeability, represented by P(gas), for example $P(O_2)$ for oxygen permeability, is defined as the degree which a permeating molecule passes through a separation membrane and is expressed in unit of Barrer.

$P(gas)[Barrer] = V \cdot l/(A \cdot t \cdot p)[(10\ cm^3(STP)\ cm)/(cm^2\ sec\ cmHg)]$ wherein, V represents a volume of gas after passing through the separation membrane at standard pressure and temperature, l represents a thickness of the separation membrane, A represents an area of the separation membrane, t represents the time interval of measuring the volume of gas which has passed through the separation membrane, and p represents the pressure of gas contacting the separation membrane.

When a fluid comprising various components passes through a separation membrane, the permeability of each component varies according to the property of the separation membrane. When a two-component mixture passes through a separation membrane, the ratio of the permeability of the faster component to that of the slower component is defined as permeation selectivity. For example, in case of an oxygen-nitrogen mixture, the permeation selectivity for $O_2/N_2$ is expressed as $\alpha(O_2/N_2)$, indicating the ratio between the permeability of the two gases, that is, $P(O_2)/P(N_2)$.

The permeability of a separation membrane to a gas is measured according to a low-pressure, constant-volume method. A flat sheet separation membrane is fixed by a means for holding the separation membrane which is comprised of an upper and lower part made of stainless steel. Gas at a gauge pressure of around 760 mmHg is introduced over the separation membrane. The effective area of the separation membrane contacting with gas is 14 $cm^2$. The lower part of the separation membrane is connected with a gas collector made of stainless steel, which is in turn connected to a gas chromatography column and vacuum pump through a 6-way selection valve. The measurement of gas permeability is accomplished by evacuation of the upper and lower parts of the separation membrane using the vacuum pump such that the pressure therein is below 0.1 mmHg in order to completely remove remaining gas, and then shutting off the vacuum pump, and introducing the gas to be measured to the upper part of separation membrane. The gas then passes through the separation membrane while contacting the membrane and the permeating gas is gathered in the gas collector which is connected to the lower part of the separation membrane, whereby the pressure in the gas collector is raised. The increase in pressure in the collector is determined by means of a pressure transducer, and the gas permeability is determined from the rate of increase in pressure against time for a given period of time. For permeation of a gas mixture, the separation membrane is fixed with a holder having an inlet and outlet for gas in the upper part and gas mixture flows through the inlet and outlet. The rate at which the gas mixture is introduced is adjusted such that the volume of the gas after permeating the separation membrane for a given time is up to 1% of the volume of the gas which entered the upper part of the membrane. The composition of gas which passes through the separation membrane and gathered in the collector below the membrane is analyzed by gas chromatography which is connected by a 6-way selection valve.

DESCRIPTION OF THE PREFERRED EMBODIMENTS

The present invention will be illustrated in greater detail by way of the following examples. The examples are presented for illustrative purpose only and should not be construed as limiting the invention, which is properly delineated in the claims.

EXAMPLE 1–5

Polyamide was synthesized from 2,2'-bis(trifluoromethyl) benzidine (PFMB) according to the low-temperature solution polymerization using tertiary amine with alkali metal salt added, which is a typical polymerization method of aramid. 100 ml of N-methyl-2-pyrrolidone was added to a 250 ml round-bottom flask equipped with a stirring device followed by 2.5 g of calcium chloride. The temperature was allowed to rise to 50° C. while stirring. After the calcium chloride had been dissolved completely, the resulting solution was cooled to room temperature, and 3.0 g of 2,2'-bis(trifluoromethyl)benzidine and then 2.4 ml of pyrridine were added. To the polymerization solution cooled to –5° C. was added 4.0 g of 4,4'-(hexafluoroisopropylidene) bis (benzoylchloride) (HPBC) at once while stirring vigorously, and thereafter mild agitation was continued for 2 hours at –5° C. to complete polymerization. The resultant polymerization solution was added dropwise to 500 ml of methanol to precipitate the polyamide, which was filtered, washed with methanol and then dried in a vacuum oven. The resulting PFMB/HPBC polyamide was dissolved in N,N-dimethylacetamide at a concentration of 5% by weight to produce a polymer casting solution of polyamide. The polymer solution prepared as above was cast on a glass plate using a doctor knife with 0.4 mm of clearance and dried by evaporating the solvent for 24 hours under nitrogen purge in an oven kept at 80° C. The dried separation membrane was stripped from the glass plate, held in a vacuum oven at 200° C. for 24 hours to remove the residual solvent to give final separation membrane having 0.02 mm of thickness. This separation membrane was measured for gas permeability at 20° C. The result is shown in Table 1 below.

TABLE 1

| Ex. No. | Gas | Tem.(° C.) | permeability (barrer) |
|---|---|---|---|
| 1 | He | 20 | 140 |
| 2 | $CO_2$ | 20 | 50.9 |
| 3 | $O_2$ | 20 | 22.6 |
| 4 | $N_2$ | 20 | 4.3 |
| 5 | $CH_4$ | 20 | 3.7 |

EXAMPLE 6–11

Polyamides were prepared following the same procedures with Example 1, by polycondensing 5:5 mixtures (by mole) of 2,2'-bis(trifluoromethyl) benzidine (PFMB) and each of the compounds as listed in Table 2 below, respectively. The resulting polyamides were dissolved in N-methyl-2-pyrrolidone(NMP) at a concentration of 5% by weight to produce polymer casting solutions of polyamide. The solutions were cast, post-treated and dried following the same procedures as in Example 1. The amount of dicarboxyl chloride used in condensation polymerization and the thickness of the separation membranes prepared are shown in Table 2. These separation membranes were measured for the gas permeability with an oxygen/nitrogen mixture (21:79 by volume) at a room temperature. The results are shown in Table 2.

TABLE 2

| Ex. No. | dicarboxylic chloride (weight) | Thickness of separation membrane (mm) | Tem. (° C.) | $P(O_2)$ (barrer) | $P(O_2)/P(N_2)$ |
|---|---|---|---|---|---|
| 6 | isophthalic chloride (1.9 g) | 0.019 | 25 | 1.9 | 5.9 |
| 7 | terephathalic chloride (1.9 g) | 0.019 | 25 | 1.7 | 6.3 |
| 8 | 4,4'-methylene bis(benzoic acid) chloride (2.8 g) | 0.020 | 23 | 9.4 | 5.2 |
| 9 | 4,4'-(hexavluoro isopropylidene) bis(benzoic acid) chloride (4.0 g) | 0.020 | 21 | 18.7 | 4.6 |
| 10 | diphenyl ether 4,4'-dicarboxylic chloride (2.8 g) | 0.022 | 25 | 4.8 | 5.4 |
| 11 | isophthalic acid/terephthalic acid chloride mixture (5:5 by mole) (1.9 g) | 0.019 | 25 | 1.9 | 6.0 |

What is claimed is:

1. A separation membrane for separating fluids comprising of high molecular weight polyamide having a repeating unit represented by the formula (I)

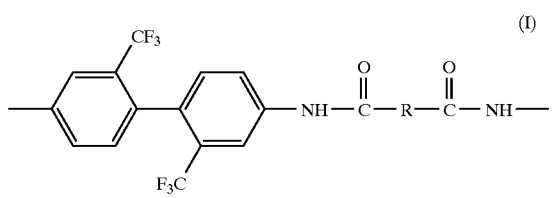

wherein,
R is an aliphatic or aromatic organic group derived from a dicarboxylic acid or halide.

2. The separation membrane of claim 1, in which the dicarboxylic acid is selected from the group consisting of isophthalic acid, terephthalic acid, 4,4'-methylene bis (benzoic acid), 4,4'-(hexafluoroisopropylidene) bis(benzoic acid), diphenyl ether 4,4'-dicarboxylic acid and a mixture of any two or more thereof.

3. The separation membrane of claim 1, in which the dicarboxylic halide is dicarboxylic chloride.

4. The separation membrane of claim 3, in which the dicarboxylic halide is selected from the group consisting of isophthalic chloride, terephthalic chloride, 4,4'-methylene bis(benzylic acid) chloride, 4,4'-(hexafluoroisopropylidene) bis(benzoic acid) chloride, diphenyl ether 4,4'-dicarboxylic chloride and a mixture of any two or more thereof.

5. The separation membrane of claim 1, wherein R is derived from adipic acid, 1,4-cyclohexane dicarboxylic acid, or isophthalic acid, 1,5-naphthalene dicarboxylic acid, 4-methyl isophthalic acid, or 4-bromo isophthalic acid.

6. The separation membrane of claim 1, which is on a support.

7. A process for separating a gas mixture with at least two components, which comprises contacting the gas mixture with the polyamide separation membrane of claim 1, whereby a component of the gas mixture passing through the separation membrane at a faster rate is selectively separated.

8. The process of claim 7, wherein said gas mixture is $H_2/CH_4$.

9. The process of claim 7, wherein said gas mixture is $He/N_2$.

10. The process of claim 7, wherein said gas mixture is $H_2/CO_2$.

11. The process of claim 7, wherein said gas mixture is $O_2/N_2$.

12. The process of claim 7, wherein said gas mixture is $CO_2/CH_4$.

13. The process of claim 7, wherein said gas mixture is $CO_2/N_2$.

* * * * *